United States Patent
Lee et al.

(10) Patent No.: US 7,021,813 B2
(45) Date of Patent: Apr. 4, 2006

(54) BACKLIGHT ASSEMBLY FOR LIQUID CRYSTAL DISPLAY DEVICE HAVING DIFFUSIVE REFLECTOR

(75) Inventors: Sang-Duk Lee, Yongin-si (KR); Jin-Hyuk Park, Seoungnam-si (KR)

(73) Assignee: Samsung Electronics Co., Ltd. (KR)

( * ) Notice: Subject to any disclaimer, the term of this patent is extended or adjusted under 35 U.S.C. 154(b) by 197 days.

(21) Appl. No.: 10/449,133

(22) Filed: May 29, 2003

(65) Prior Publication Data

US 2004/0001345 A1 Jan. 1, 2004

(30) Foreign Application Priority Data

Jun. 29, 2002 (KR) .................................... 2002-37467

(51) Int. Cl.
*F21V 7/09* (2006.01)

(52) U.S. Cl. .................. 362/609; 362/608; 362/560; 362/561; 362/297; 362/348; 349/67

(58) Field of Classification Search ................ 362/23, 362/26, 27, 31, 551, 558, 559, 560, 561, 362/217, 257, 296, 297, 298, 310, 317, 341, 362/347, 348, 350; 349/56, 58, 59, 61, 62, 349/65, 67, 70
See application file for complete search history.

(56) References Cited

U.S. PATENT DOCUMENTS

| | | | | |
|---|---|---|---|---|
| 494,339 A | * | 3/1893 | Marston | 362/348 |
| 838,789 A | * | 12/1906 | Klein | 362/348 |
| 871,915 A | * | 11/1907 | Curtis | 362/348 |
| 1,258,007 A | * | 3/1918 | Hess | 362/348 |
| 1,593,402 A | * | 7/1926 | Halvorson, Jr. | 362/348 |
| 2,254,222 A | * | 9/1941 | Harvey et al. | 362/221 |
| 2,268,446 A | * | 12/1941 | Gaynor | 439/232 |
| 2,295,883 A | * | 9/1942 | Williams | 439/230 |
| 2,314,233 A | * | 3/1943 | McSween | 200/51 R |
| 2,368,879 A | * | 2/1945 | Reeves | 362/219 |
| 2,382,878 A | * | 8/1945 | Holecek | 362/220 |
| 2,393,062 A | * | 1/1946 | Reeves | 362/341 |
| 2,488,677 A | * | 11/1949 | McCann | 439/243 |
| 3,758,770 A | * | 9/1973 | Morasz | 362/348 |
| 4,078,170 A | * | 3/1978 | Sloop | 362/322 |
| 4,241,393 A | * | 12/1980 | Olson | 362/348 |
| 4,562,517 A | * | 12/1985 | Pankin | 362/147 |
| 4,617,562 A | * | 10/1986 | Klotz | 345/38 |
| 5,438,484 A | * | 8/1995 | Kanda et al. | 362/31 |
| 5,499,165 A | * | 3/1996 | Holmes, Jr. | 362/31 |
| 5,560,698 A | * | 10/1996 | Okano | 362/31 |
| 5,667,289 A | * | 9/1997 | Akahane et al. | 362/31 |
| 5,931,555 A | * | 8/1999 | Akahane et al. | 362/31 |
| 6,186,649 B1 | * | 2/2001 | Zou et al. | 362/347 |
| 6,369,950 B1 | * | 4/2002 | Umemoto | 359/628 |
| 6,461,023 B1 | * | 10/2002 | McLoughlin et al. | 362/297 |
| 6,491,411 B1 | * | 12/2002 | Itoh | 362/246 |

* cited by examiner

*Primary Examiner*—John Anthony Ward
*Assistant Examiner*—Ismael Negron
(74) *Attorney, Agent, or Firm*—Cantor Colburn LLP

(57) ABSTRACT

An illuminating apparatus for improving brightness of light, a backlight assembly and an LCD device having the same are provided. The LCD device includes a backlight unit having a lamp for emitting a first light, a light guiding plate for guiding the first light, and a lamp reflector disposed adjacent to the lamp to partially cover the lamp and receiving the first light exited from the lamp, the lamp reflector having a plurality of protrusion portions for diffusing and reflecting the received first light to generate a second light; and a display unit for displaying images in response to the second light, the display unit having a lower substrate, an upper substrate opposite to the lower substrate, and a liquid crystal layer disposed between the lower and the upper substrates.

25 Claims, 7 Drawing Sheets

BACKLIGHT ASSEMBLY FOR LIQUID CRYSTAL DISPLAY DEVICE HAVING DIFFUSIVE REFLECTOR

BACKGROUND OF THE INVENTION

1. Field of the Invention

This disclosure relates to an illuminating apparatus, a backlight assembly and a liquid crystal display device having the same, more particularly, to an illuminating apparatus providing an enhanced brightness, a backlight assembly and a liquid crystal display device having the same.

2. Description of the Related Art

Electronic display devices have been important as information transmission medias, and various electronic display devices are widely applied in industrial devices and home appliances. Such electronic display devices have been continuously improved to have new functions appropriate for various demands of users.

In general, electronic display devices display and transmit various information to users. That is, the electronic display devices convert electric information signals into light information signals capable of being recognized by users.

Electronic display devices may be categorized into emissive type display devices and non-emissive type display devices. The emissive type display devices may include a cathode ray tube ("CRT"), a plasma display panel ("PDP"), a light emitting diode ("LED") and/or an electro luminescent display ("ELD"), for example. The emissive display type devices are also called active display devices. The non-emissive display devices, which are also called passive display devices, may include a liquid crystal display ("LCD") device, an electrochemical display ("ECD") and/or an electrophoretic image display ("EPID"), for example.

Flat plate type display devices have lighter weight and smaller size, in comparison with the CRT, and various flat plate type display devices have been developed to provide full-color, high resolution and the like.

In LCD devices, as a representative of the flat plate type display devices, an electric field is applied to liquid crystal molecules, and an alignment of the liquid crystal molecule is changed depending on the electric field, to thereby change optical properties of the liquid crystal, such as double refraction, optical rotatory power, dichroism, light scattering, etc. The LCD devices display images by using the changes of the optical properties of the liquid crystal.

As mentioned above, the LCD devices are non-emissive type display devices, so that the LCD devices display images by reflecting the external light transmitted through an LCD panel or by using the light emitted from a light source, e.g. a backlight assembly, disposed below the LCD panel.

This backlight assembly includes a lamp unit for emitting light, a light guiding plate ("LGP") for guiding the light emitted from the lamp unit toward the LCD panel, a reflecting plate (or a reflector) disposed under the light guiding plate so as to reflect the lights leaked from the light guiding plate toward the light guiding plate, and optical sheets for enhancing brightness of the light exited from the light guiding plate.

In general, the backlight assembly may be categorized into a flat type backlight assembly having lamp units at both sides of the light guiding plate and a wedge type backlight assembly having a lamp unit (lamp units) at one side of the light guiding plate, depending upon locations of the lamp units with respect to the light guiding plate.

FIG. 1 is a sectional view showing a conventional flat type backlight assembly.

Referring to FIG. 1, the flat type backlight assembly includes lamp reflectors 12a and 12b, lamp units 14a and 14b, and a reflection plate 18. The lamp reflectors 12a and 12b are disposed on both sides of a light guiding plate 10, and the lamp units 14a and 14b are received in the lamp reflectors 12a and 12b. The light guiding plate 10 guides the light emitted from the lamp units 14a and 14b toward a diffusion sheet 16, and the lamp reflectors 12a and 12b prevent the light emitted from the lamp units 14a and 14b from being leaked from the backlight assembly. The reflection plate 18 reflects the light leaked from the light guiding plate 10 toward the light guiding plate 10.

The light guiding plate 10 installed in the backlight assembly is comprised of a high polymer, e.g. polymethyl methacrylate ("PMMA") or cyclic olefin polymer ("COP"), so that the light guiding plate 10 is the heaviest element of the elements in an LCD module. Accordingly, the wedge type backlight assembly may be proper for an LCD device of a lap top computer, in which a lighter weight and a slimmer size are important factors, rather than the flat type backlight assembly.

FIG. 2 is a sectional view showing a conventional wedge type backlight assembly.

Referring to FIG. 2, the wedge type backlight assembly includes a lamp reflector 22 and a lamp unit 24. A light guiding plate 20 guides the light emitted from the lamp unit 24 toward a diffusion sheet 26. The lamp reflector 22 is disposed on one side of the light guiding plate 20, and prevents the light emitted from the lamp unit 24 from being leaked from the lamp unit 24. The lamp unit 24 is disposed in the lamp reflector 22. The backlight assembly further includes a reflecting plate 28 disposed under the light guiding plate 20 for reflecting the light leaked from a lower surface of the light guiding plate 20.

However, there is a limit in enhancing brightness of the backlight assembly when the backlight assembly employs a lamp reflector that provides specular reflection property.

SUMMARY OF THE INVENTION

The present invention provides an illuminating apparatus that can provide an enhanced brightness.

Further, the present invention provides a backlight assembly including the illuminating apparatus.

Furthermore, the present invention provides a liquid crystal display device including the illuminating apparatus.

According to one aspect of the invention, there is provided an illuminating apparatus comprising: a lamp for receiving an electric power signal to emit light; and a lamp reflector for partially covering the lamp and for receiving the light exited from the lamp, the lamp reflector having a plurality of protrusion portions to reflect and diffuse the received light.

According to another aspect of the invention, there is provided a backlight assembly comprising: a lamp for emitting light; a light guiding plate for guiding the light; and a lamp reflector, disposed adjacent to the lamp to partially cover the lamp and receiving the light exited from the lamp, the lamp reflector having a plurality of protrusion portions for reflecting and diffusing the receive light.

According to further aspect of the invention, there is provided a liquid crystal display device comprising: a backlight unit, including a lamp for emitting a first light; a light guiding plate for guiding the first light; and a lamp reflector disposed adjacent to the lamp to partially cover the lamp and receiving the light exited from the lamp, the lamp reflector having a plurality of protrusion portions for reflecting and diffusing the received first light to generate a second light; and a display unit for displaying an image in response to the second light exit from the backlight unit, including a lower substrate; an upper substrate opposite to the lower substrate; and a liquid crystal layer disposed between the lower and the upper substrates.

According to the illuminating apparatus, the backlight assembly and the LCD device having the same, the lamp reflector covering the lamp has protrusion portions. Preferably, the protrusion portions have a pointed end or a round end. A 'diffuse reflection' phenomenon (in which light is reflected and diffused) occurs at the protrusion portions of the reflecting surface, so that the brightness of the LCD device is enhanced.

Also, a material having high reflectivity may be coated on the reflecting surface of the lamp reflector to provide enhanced brightness. Also, the lamp reflector that has protrusion portions for inducing the 'diffuse reflection' may be also applied to a lamp for home-use or a lamp for industrial purpose to enhance the brightness of the lamp.

BRIEF DESCRIPTION OF THE DRAWINGS

The above and other features and advantages of the present invention will become more apparent by describing embodiments thereof in detail with reference to the accompanying drawings in which.

DETAILED DESCRIPTION OF PREFERRED EMBODIMENTS

Hereinafter, the present invention will be described in detail with reference to accompanying drawings. Also, descriptions related to elements, which are already described in a previous embodiment, may serve as a reference to descriptions of other elements, which are identical or similar to the elements of the previous embodiments, in following embodiments.

Figure 1:
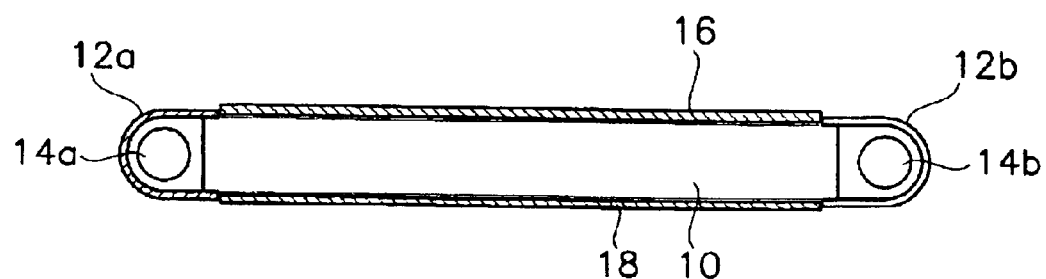
FIG. 1 is a sectional view showing a conventional flat type backlight assembly.
Figure 2:
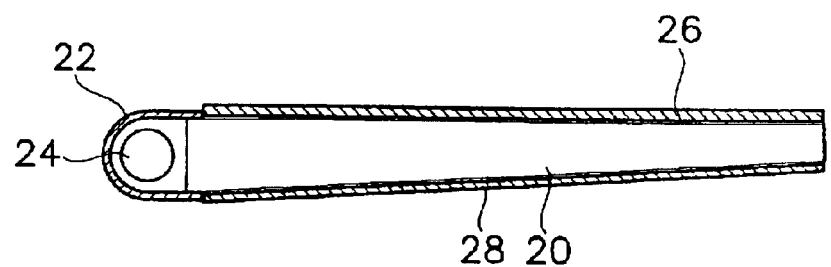
FIG. 2 is a sectional view showing a conventional wedge type backlight assembly.
Figure 3:
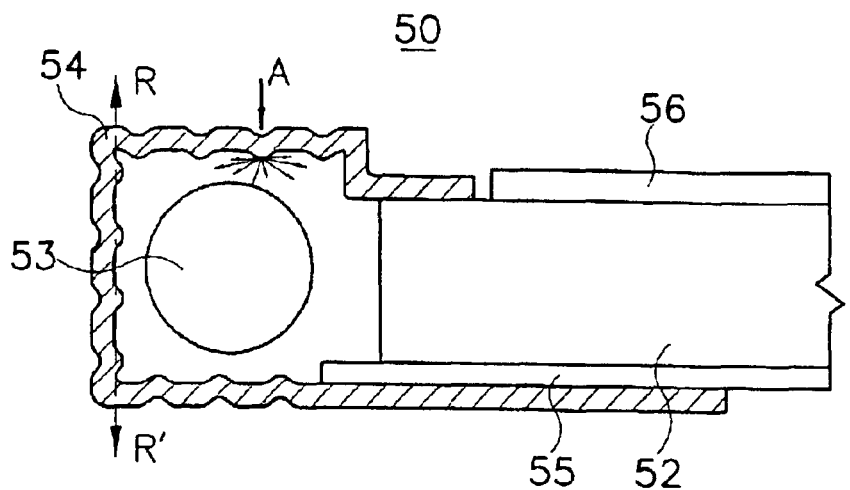
FIG. 3 is a partially enlarged sectional view showing a backlight assembly according to a first exemplary embodiment of the present invention.

FIG. 3 is a partially enlarged sectional view showing a backlight assembly according to a first exemplary embodiment of the present invention.

Referring to FIG. 3, a backlight assembly 50 according to a first exemplary embodiment of the present invention includes a light guiding plate 52, a lamp 53, a lamp reflector 54, a reflecting plate 55, and an optical sheet 56.

The lamp 53 is disposed on one side of the light guiding plate 52, and emits light. The lamp reflector 54 reflects the light emitted from the lamp 53 toward the light guiding plate 52. The reflecting plate 55 is disposed under the light guiding plate 52, and reflects the light exited from a lower surface of the light guiding plate 52 toward the light guiding plate 52. The optical sheet 56 is disposed on the light guiding plate 52, and controls brightness of the light guided by the light guiding plate 52 to output the light with enhanced brightness.

The lamp reflector 54 is made of material comprising stainless steel or brass, and partially covers the lamp 53. The lamp reflector 54 includes protrusion portions formed on an inner surface of the lamp reflector 54, and a "diffuse reflection" phenomenon occurs on the inner surface of the lamp reflector 54. For instance, the light emitted from the lamp 53 is incident into the inner surface of the lamp reflector 54 at an incident angle with respect to an incident plane, and is reflected and dispersed from the inner surface of the lamp reflector 54 at various angles regardless of the incident angle.

As shown in FIG. 3, each protrusion portion on the inner surface (or reflecting surface) of the lamp reflector 54 may have a round end portion to reflect the light emitted from the lamp 53. The protrusion portions having the round end portions may be made through a pressing process from the outer surface to the inner surface ('A' direction of FIGS. 3 and 4) of the lamp reflector 54.

The protrusion portions having the round end portions may have identical diameter and height, and be regularly arrayed on the inner surface of the lamp reflector 54. Here, the diameter and height of each of the protrusion portions is measured with respect to a reference-reflecting surface (R–R') of the inner surface of the lamp reflector 54. Also, the protrusion portions having the round end portions may have different diameter and height, and be irregularly arrayed on the inner surface of the lamp reflector 54.

Preferably, each protrusion portion of the lamp reflector 54 may have a tapered shape. For instance, an area of the cross section of one of the protrusion portions may decrease according to approaching to an end of the protrusion portion from the reference reflection surface (R–R'). Hereinafter, the reference reflection surface (R–R') is defined as a reflection surface of the lamp reflector 54 before the protrusion portions are formed by the pressing process.

The protrusion portions may have various cross sections such as a circle shape, an ellipse shape, a triangle shape, a quadrangle shape, a pentagon shape and the like.

In addition, material having high reflectivity, e.g. silver (Ag) and titanium (Ti) may be coated on the reflecting surface of the lamp reflector 54 to improve the enhanced brightness of the light. The material may be coated on the reflection surface of the lamp reflector 54 after the pressing process for producing the protrusion portions, or before the pressing process.

The reflecting plate 55 is disposed under the light guiding plate 52 to reflect the light leaked from the light guiding plate 52 toward the light guiding plate 52. Preferably, the reflecting plate 55 is comprised of the material having high reflectivity. The reflecting plate 55 may be a flexible type, such as a sheet. Also, the reflecting plate 55 may be a rigid type, such as a plate.

The optical sheet 56 may include a diffusion sheet, prism sheets and a protective sheet, etc., and control the brightness of the light exited from the light guiding plate 52 to provide the light having the enhanced brightness to an LCD panel (not shown).

Figure 4:
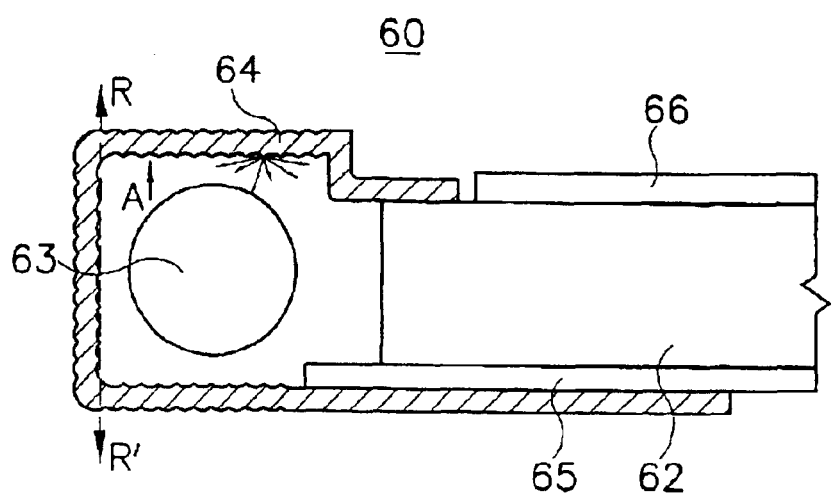
FIG. 4 is a partially enlarged sectional view showing a backlight assembly according to a second exemplary embodiment of the present invention.

FIG. 4 is a partially enlarged sectional view showing a backlight assembly according to a second exemplary embodiment of the present invention.

Referring to FIG. 4, a backlight assembly 60 according to a second exemplary embodiment of the present invention includes a light guiding plate 62, a lamp 63, a lamp reflector 64, a reflecting plate 65 and an optical sheet 66. The lamp 63 is disposed on one side of the light guiding plate 62 to emit light, and the lamp reflector 64 reflects the light emitted from the lamp 63 toward the light guiding plate 62. The reflecting plate 65 is disposed under the light guiding plate 62, and reflects the light emitted from the light guiding plate 62 to the light guiding plate 62. The optical sheet 66 is disposed on the light guiding plate 62, and controls the light exited from the light guiding plate 62.

The lamp reflector 64 has protrusion portions having a pointed end on an inner surface thereof, and the 'diffuse reflection' of the light emitted from the lamp 63 occurs at the protrusion portions. The protrusion portions having the pointed ends may be made through the pressing process in which a physical force is applied to the lamp reflector 64 from the inner surface to the outer surface ('A' direction of FIG. 4) of the lamp reflector 54.

The protrusion portions having the pointed ends may have identical diameter and height, and be regularly arrayed on the lamp reflector 64. The sizes of the protrusion portions, such as the diameter and the height of the protrusion portions, are measured with respect to a reference-reflecting surface (R–R') of the inner surface of the lamp reflector 64. Also, each protrusion portion having the pointed end may have different diameter and height, and may be irregularly arrayed on the lamp reflector 64.

Preferably, each protrusion portion on the lamp reflector 64 may have a tapered shape. An area of the cross section of each protrusion portion may decrease according to approaching to an end of the protrusion portion from the reference reflection surface (R–R'). The protrusion portions may have various cross sections such as a circle shape, an ellipse shape, a triangle shape, a quadrangle shape, a pentagon shape and the like.

In addition, the material having high reflectivity, e.g. silver (Ag) and titanium (Ti) may be coated on the reflecting surface of the lamp reflector 64 to improve the enhanced brightness of the light. The material may be coated on the reflection surface of the lamp reflector 64 after the pressing process for producing the protrusion portions, or before the pressing process.

The reflecting plate 65 is disposed under the light guiding plate 62 to reflect the light leaked from the light guiding plate 62 toward the light guiding plate 62. Preferably, the reflecting plate 65 is comprised of the material having high reflectivity. The reflecting plate 65 may be a flexible type, such as a sheet. Also, the reflecting plate 65 may be a rigid type, such as a plate.

The optical sheet 66 may include a diffusion sheet, prism sheets and a protective sheet, etc., and control the brightness of the light exited from the light guiding plate 62 to provide the light having the enhanced brightness to an LCD panel (not shown).

FIGS. 5A, 5B, 5C and 5D are partially enlarged perspective views showing a lamp reflector according to exemplary embodiments of the present invention.

Figure 5A:
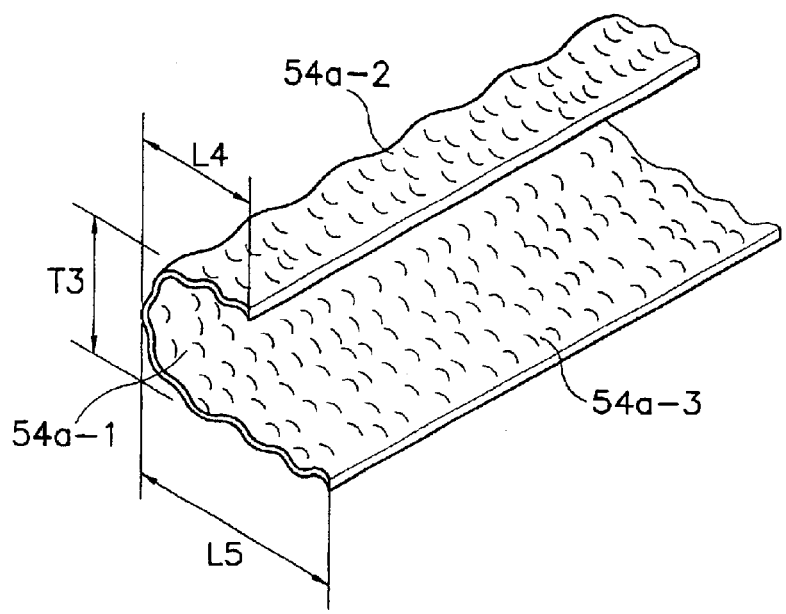
FIGS. 5a, 5b, 5c and 5d are partially enlarged perspective views showing a lamp reflector according to exemplary embodiments of the present invention.

Referring to FIG. 5A, a lamp reflector 54a according to an exemplary embodiment of the present invention includes a side section 54a-1, a first coupling section 54a-2 and a second coupling section 54a-3. The side section 54a-1 has an approximately curved face, and protrusion portions formed on the curved face. The first coupling section 54a-2 is extended from a first end of the side section 54a-1 toward an upper surface of a light guiding plate, which is received in the lamp reflector 54a, by a first length (L4) to contact with the upper surface of the light guiding plate. The first coupling section 54a-2 has protrusion portions. The second coupling section 54a-3 is extended from a second end of the side section 54a-1 toward a lower surface of the light guiding plate by a second length (L5), which is longer than the first length (L4), to directly contact with the lower surface of the light guiding plate or to contact with a lower surface of a reflecting plate, under which the lamp reflector 54a is disposed. The second coupling section 54a-3 also has the protrusion portions. The first coupling section 54a-2 is shorter than the second coupling section 54a-3 such that the light guiding plate may be easily slid into the lamp reflector 54-a.

The protrusion portions are located on an entire surface of the lamp reflector 54a of FIG. 5A. Preferably, the light guiding plate may have recesses corresponding to the protrusion portions of the lamp reflector 54a on the upper and lower surface of the light guiding plate. When the light guiding plate has flat surfaces, the first and the second coupling sections 54a-2 and 54a-3 of the lamp reflector 54a, which are contact with the light guiding plate, may not have the protrusion portions to have flat surfaces.

Figure 5B:
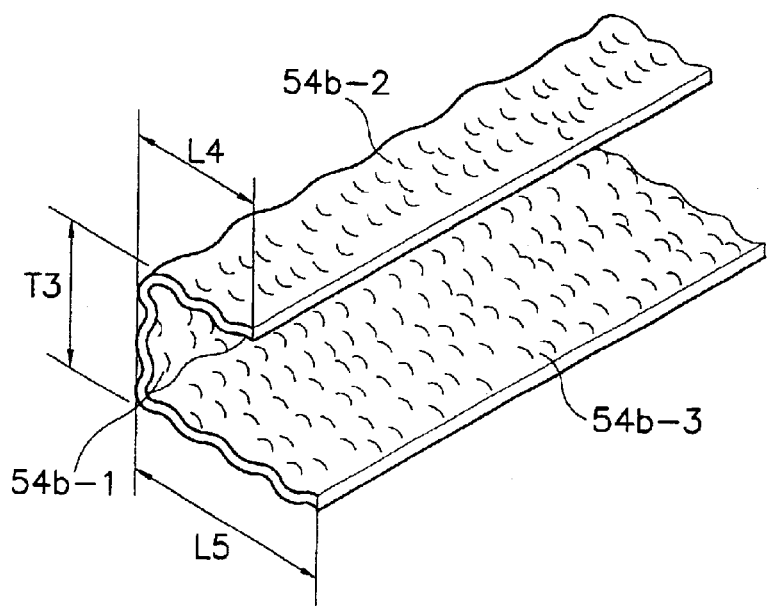

Also, referring to FIG. 5B, a lamp reflector 54b according to another exemplary embodiment of the present invention includes a side section 54b-1, a first coupling section 54b-2 and a second coupling section 54b-3. The side section 54b-1 has an approximately flat face. The first coupling section 54b-2 is extended from a first end of the side section 54b-1 toward an upper surface of a light guiding plate, which is received in the lamp reflector 54b, by a first length (L4) to contact with the upper surface of the light guiding plate. The second coupling section 54b-3 is extended from a second end of the side section 54b-1 toward a lower surface of the light guiding plate by a second length (L5), which is longer than the first length L4, to directly contact with the lower surface of the light guiding plate or to contact with a lower surface of a reflecting plate, under which the lamp reflector 54b is disposed. The side section 54b-1, first coupling section 54b-2 and second coupling section 54b-3 each have protrusion portions, and the 'diffuse reflection' of the light emitted from a lamp occurs at the protrusion portions.

Figure 5C:
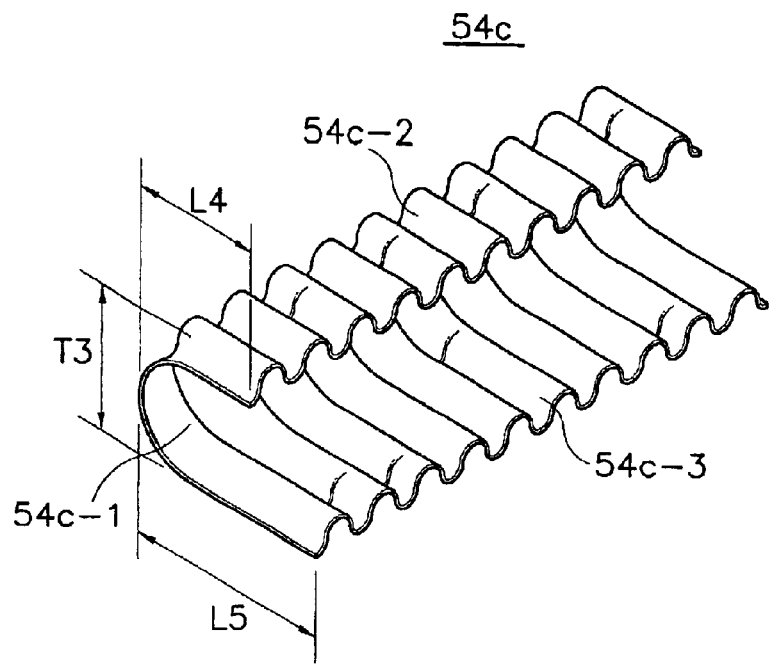

Referring to FIG. 5C, a lamp reflector 54c, according to still another exemplary embodiment of the present invention, has a wrinkled sheet shape on which protrusion portions are arranged parallel to a longitudinal axis of a lamp. The 'diffuse reflection' of the light emitted from the lamp occurs at the protrusion portions. The protrusion portions may be produced through a pressing process from an outer surface to an inner surface of the lamp reflector 54c or from the inner surface to the outer surface of the lamp reflector 54c. The lamp reflector 54c further includes a side section 54c-1, a first coupling section 54c-2 and a second coupling section 54c-3.

When the lamp reflector 54c is coupled with the upper and the lower surfaces of a light guiding plate (which is received in the lamp reflector 54c), the first and the second coupling sections 54c-2 and 54c-3, which contact with the upper or lower surfaces of the light guiding plate, may not have the protrusion portions. Alternatively, when the protrusion portions are formed on the entire surface of the lamp reflector 54c, the edge portions of the light guiding plate, which contact with the first and the second coupling sections 54d-2 and 54d-3, may have protrusion portions corresponding to the protrusion portions of the lamp reflector 54c.

Figure 5D:
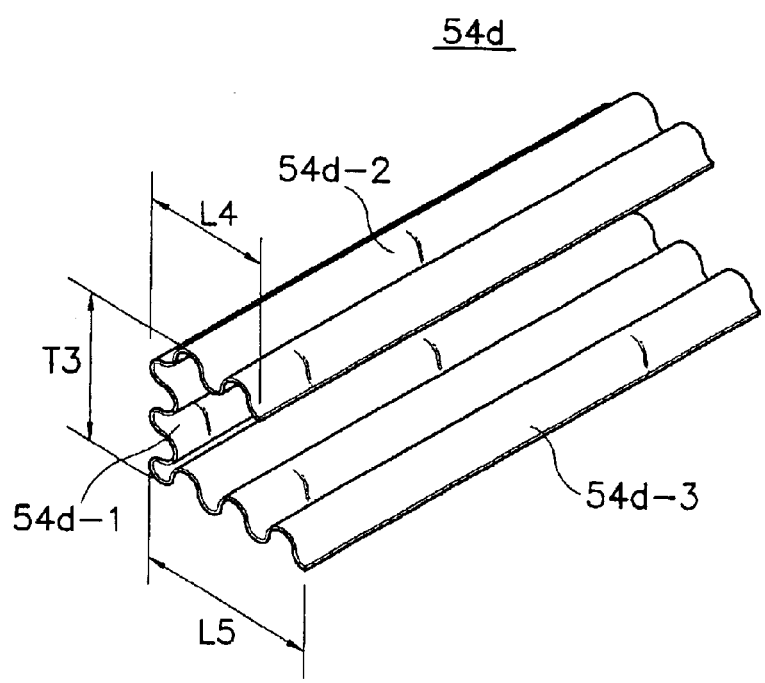

Referring to FIG. 5D, a lamp reflector 54d, according to further exemplary embodiment of the present invention, has a wrinkled sheet shape on which protrusion portions are arranged perpendicular to a longitudinal axis of a lamp. The 'diffuse reflection' of the light emitted from a lamp occurs at the protrusion portions. The protrusion portions may be produced through a pressing process from an outer surface to an inner surface of the lamp reflector 54d or from the inner surface to the outer surface of the lamp reflector 54d. The lamp reflector 54d further includes a side section 54d-1, a first coupling section 54d-2 and a second coupling section 54d-3.

When the lamp reflector 54d is coupled with the upper and the lower surfaces of a light guiding plate (which is received in the lamp reflector 54d), the first and the second coupling sections 54d-2 and 54d-3, which contact with the upper or lower surface of the light guiding plate, may not have the protrusion portions. However, when the protrusion portions are formed on the entire surface of the lamp reflector 54d, the edge portions of the light guiding plate, which contact with the first and the second coupling sections 54d-2 and 54d-3, may have protrusion portions corresponding to the protrusion portions of the lamp reflector 54d.

Although not shown in FIGS. 5C and 5D, the protrusion portions of the lamp reflector 54c or 54d may be arranged to form a predetermined angle with respect to a longitudinal axis of a lamp. The 'diffuse reflection' of the light emitted from the lamp occurs at the protrusion portions.

As mentioned above, the side section 54a-1, 54b-1, 54c-1 or 54d-1 of the lamp reflector 54a, 54b, 54c or 54d may have various shapes, and the first coupling section 54a-2, 54b-2, 54c-2 or 54d-2 may have a length identical to or different from a length of the second coupling section 54a-3, 54b-3, 54c-3 or 54d-3.

In addition, the protrusion portions of the lamp reflector 54a, 54b, 54c or 54d may have various shapes, e.g. a round shape, a pointed end shape and the like. Further, the cross sections of the protrusion portions of the lamp reflector 54a, 54b, 54c or 54d may have various faces, e.g. a circle, an ellipse, a triangle, a quadrangle, a pentagon and the like.

Figure 6:
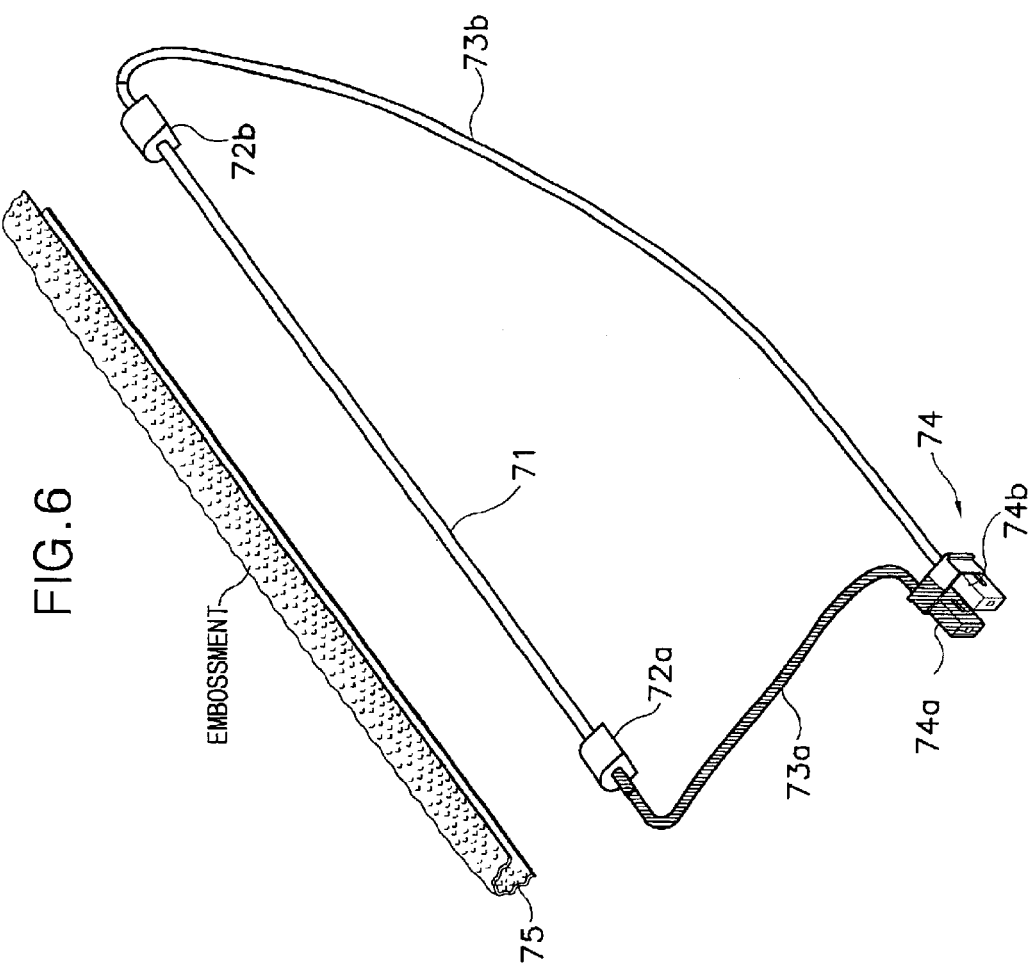
FIG. 6 is a perspective view showing an illuminating apparatus according to one exemplary embodiment of the present invention.

FIG. 6 is a perspective view showing an illuminating apparatus according to one exemplary embodiment of the present invention.

Referring to FIG. 6, an illuminating apparatus 70 according to an exemplary embodiment includes a lamp 71, first and second lamp holders 72a and 72b, first and second power supply lines 73a and 73b, a connector 74 and a lamp reflector 75.

The lamp 71 emits light in response to the electric power supplied through the first and second power supply lines 73a and 73b. The lamp 71 may be an EEFL (External Electrode Fluorescent Lamp) in which an external electrode (electrodes) is (are) formed on a glass tube of the EEFL. Also, the lamp 71 may be an IEFL (Inner Electrode Fluorescent Lamp). Also, the lamp 71 has a hot electrode (a first electrode) disposed at a first end portion of the lamp 71 to receive a (+) power voltage and a cold electrode (a second electrode) disposed at a second end portion of the lamp 71 to receive a (−) power voltage.

The first lamp holder 72a receives the first end portion of the lamp 71 (or the first electrode), and the second lamp holder 72b receives the second end portion of the lamp 71 (or the second electrode). The first and second electrodes may be lead wires withdrawn toward an external surface of a lamp tube in an inner electrode fluorescent lamp, and may be lamp sockets covering a portion of the lamp tube in an external electrode fluorescent lamp.

The first power supply line 73a supplies a first power signal to the first electrode of the lamp 71 through a first hole formed on the first lamp holder 72a, and the second power supply line 73b supplies a second power signal to the second electrode of the lamp 71 through a second hole formed the second lamp holder 72b.

As shown in FIG. 6, the first power supply line 73a for supplying a high voltage power signal is shorter than the second power supply line 73b for supplying a low voltage power signal, since the first power supply line 73a may generate heat to damage surrounding electric devices when the first power supply line 73a is longer than the second power supply line 73b.

Preferably, the first power supply line 73a may be distinguished from the second power supply line 73b by a color. The second power supply line 73b is installed along an outer surface of the lamp reflector 75, and the second power supply line 73b may be bonded on the outer surface of the lamp reflector 75 with an adhesion and the like.

The connector 74 has a first connector 74a electrically connected to the first power supply line 73a, and a second connector 74b electrically connected to the second power supply line 73b. The connector 74 is connected with an inverter (not shown in FIG. 6) and supplies the first power signal and the second power signal to the first power supply line 73a and the second power supply line 73b, respectively, thereby supplying the electric power to the lamp 71. A plug type connector is employed in the illuminating apparatus of FIG. 6, but a socket type connector may be employed as the connector 74 of the present invention.

The lamp reflector 75 partially covers the lamp 71, the first lamp holder 72a and the second lamp holder 72b. The lamp reflector 75 includes embossments on the inner surface thereof, and the 'diffuse reflection' of the light emitted from the lamp occurs at the embossments.

The lamp reflector 75 of the present invention is applied to a backlight assembly installed in an LCD device, but may be also applied to other devices, apparatus and appliances including an illuminating apparatus. For example, the lamp reflector 75, which has protrusion portions for inducing the 'diffuse reflection' instead of inducing 'specular reflection', may be also applied to a lamp for home-use or a lamp for industrial purpose to enhance the brightness of the lamp.

Figure 7:
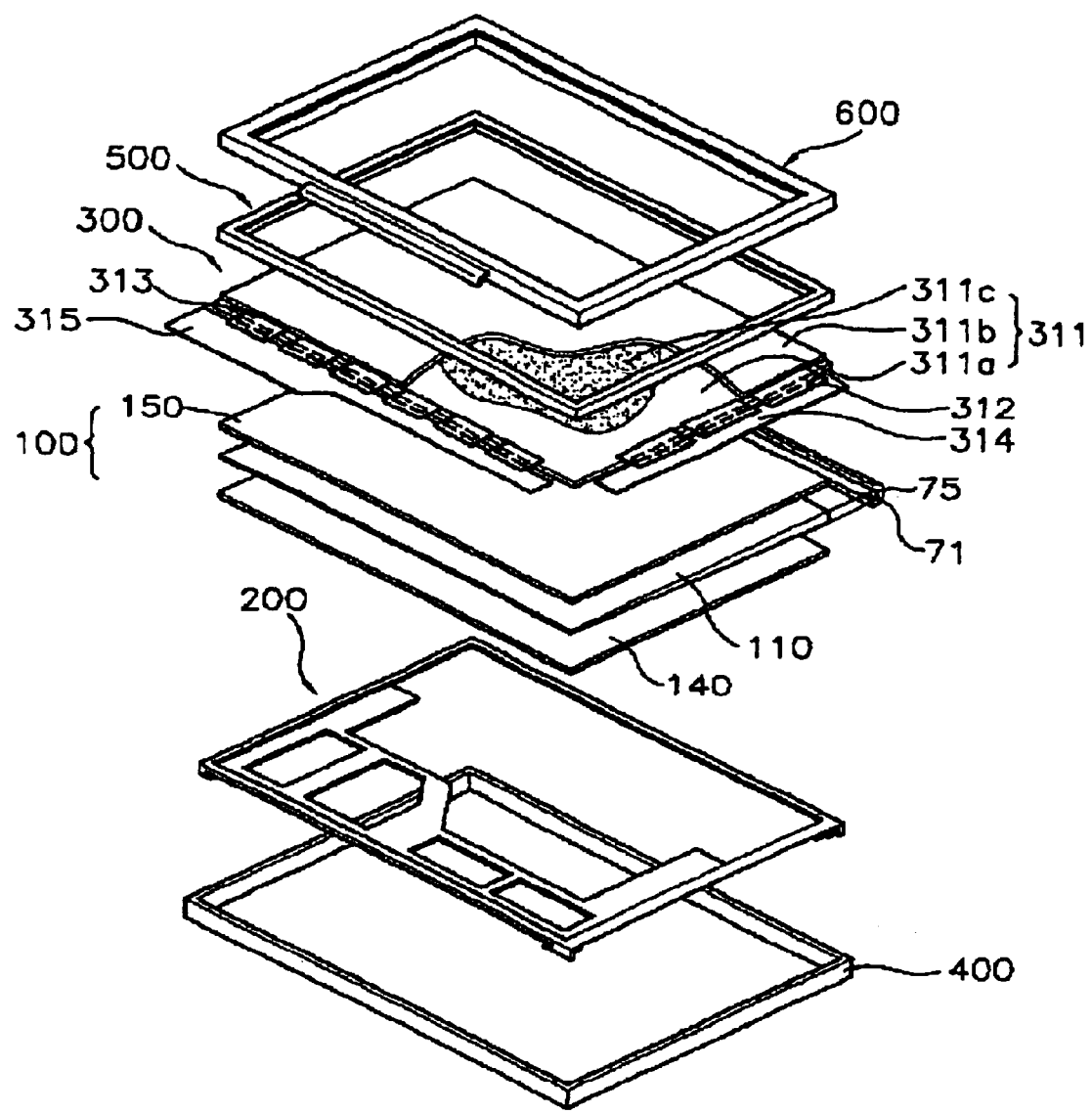
FIG. 7 is an exploded perspective view showing a liquid crystal display device according to one exemplary embodiment of the present invention.
Figure 8:
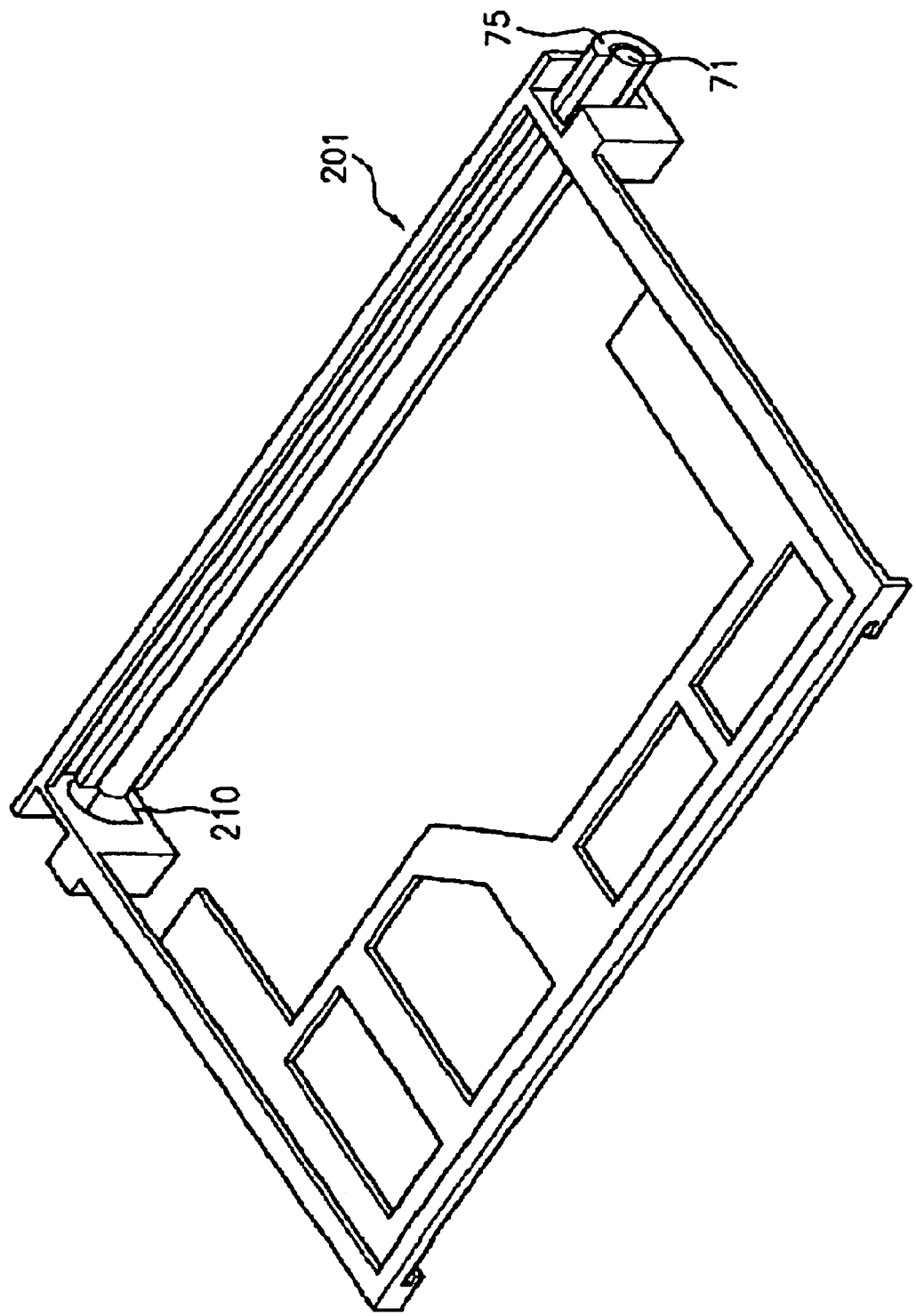
FIG. 8 is a perspective view showing a mold frame of a liquid crystal display device according to another exemplary embodiment of the present invention.

FIG. 7 is an exploded perspective view showing a liquid crystal display device according to one exemplary embodiment of the present invention; and FIG. 8 is a perspective view showing a mold frame of a liquid crystal display device according to another exemplary embodiment of the present invention.

Referring to FIG. 7, an LCD device according to an exemplary embodiment of the present invention includes a backlight assembly 100, a mold frame (or receiving container) 200, a display unit 300, a rear case 400, a top chassis 500 and a front case 600.

The backlight assembly 100 includes a lamp 71 for emitting light, a lamp reflector 75 for partially covering the lamp 71 to reflect the light emitted from the lamp 71 toward a light guiding plate 110, the light guiding plate 110 for guiding the light toward the display unit 300 to change the path of the light, optical sheets 150 for controlling the brightness of the light exited from the light guiding plate 110, and a reflecting plate 140 disposed under the light guiding plate 110 to reflect the light leaked from the light guiding plate 110 toward the light guiding plate 110.

The mold frame 200 has four sidewalls and a rib, and receives the backlight assembly 100. The four sidawalls seal the backlight assembly 100, and the rib is formed at the bottom of the mold frame 200. In one embodiment, an edge of one of the sidewalls adjacent to one end of the lamp 71 may have a guiding portion 210 in order that the lamp 71 and the lamp reflector 75 are easily attached and detached from the mold frame 201 as shown in FIG. 8. The lamp 71 and the lamp reflector 75 are slid through the guiding portion, to thereby be installed in the mold frame 200.

The display unit 300 is disposed on the backlight assembly 100, and receive the light emitted from the backlight assembly 100 to display images. The display unit 300 includes an LCD panel 311 having a lower subatrate 311a, an upper substrate opposite to the lower substrate 311b and a liquid crystal layer disposed between the lower and upper substrate 311c, gate-side and data-side printed circuit boards ("PCB") 312 and 313, and gate and data tape carrier package 314 and 315.

The rear case 400 is coupled with the front case 600 to receive the mold frame 200, which receives the backlight assembly 100 and the display unit 300. The top chassis 500 is disposed between the front case 600 and the display unit 300.

Although exemplary preferred embodiments of the present invention have been described, it is to be understood that the present invention should not be limited to these preferred embodiments, but that various changes and modifications can be made by one skilled in the art while remaining within the spirit and scope of the present invention as hereinafter claimed.

What is claimed is:

1. A backlight assembly comprising:
   a lamp, that emits light;
   a light guiding plate, that guides the light; and
   a lamp reflector, disposed adjacent to the lamp to partially cover the lamp and receiving the light exited from the lamp, the lamp reflector having a plurality of protrusion poitions that reflects and diffuses the receiving light, and a plurality of corrugations,
   wherein the protrusiong portions are formed on peak portions of the corrugations, and the corrugations are arranged substantially parallel to a longitudinal axis of the lamp.

2. The backlight assembly as claimed in claim 1, wherein a first end of the lamp reflector is coupled to a portion of a lower surface of the light guiding plate, and a second end of the lamp reflector is coupled to a portion of an upper surface of the light guiding plate, to thereby partially cover the lamp.

3. The backlight assembly as claimed in claim 1, further comprising a reflecting sheet that is disposed on a lower surface of the light guiding plate and reflects the light transmitted through the light guiding plate.

4. The backlight assembly as claimed in claim 1, further comprising an oplical sheet that is disposed on the light guiding plate and contols a brightness of the light transmitted through the light guiding plate.

5. The backlight assembly as claimed in claim 1, further comprising:
   a first lamp holder that receives a first end portion of the lamp holder having a first hole;
   a second lamp holder that receives a second end portion of the lamp holder having a second hole;
   a first power supply line that penetrates through the first hole and supplies a first electric power signal to a first electrode of the lamp; and
   a second power supply line that penetrates through the second hole and supplies a second electric power signal to a second electrode of the lamp.

6. The backlight assembly as claimed in claim 1, further comprising a receiving container having four sidewall to receive the lamp, the light guiding plate and the lamp reflector; and
   wherein one of the sidewalls adjacent to an end of the lamp has a guiding portion that attaches and detaches the lamp and the lamp reflector from the receiving container.

7. The backlight assembly as claimed in claim 1, wherein each of the protrusion portions has a pointed end portion that faces the lamp.

8. The backlight assembly as claimed in claim 1, wherein each of the protrusion portions has a round end portion that faces the lamp.

9. The backlight assembly as claimed in claim 1, wherein the protrusion portions are arrayed in a plurality of rows, and each of the rows forms a predetermined angle with respect to the lamp.

10. The backlight assembly as claimed in claim 1, wherein the protrusion portions are regularly arrayed on the lamp reflector.

11. The backlight assembly as claimed in claim 10, wherein the protrusion portions are substantially uniform in size.

12. The backlight assembly as claimed in claim 1, wherein a material having high reflectivity is coated on an inner surface of the lamp reflector to improve a reflectivity of the lamp reflector.

13. The backliglit assembly as claimed in claim 12, wherein the material having high reflectivity comprises silver or titanium.

14. The backlight assembly as claimed in claim 1, wherein the lamp reflector further comprises:
   a side section;
   a first coupling section that extends from a first end of the side section toward an upper surface of the light guiding plate, and contacts and covers an end portion of the upper surface of the light guiding plate; and
   a second coupling section that extends from a second end of the side section toward a lower surface of the light guiding plate, and contacts and covers an end portion of the lower surface of the light guiding plate.

15. The backlight assembly as claimed in claim 14, wherein the side section has an approximately curved face.

16. The backlight assembly claimed in claim 14, wherein the side section has an approximately flat face.

17. A liquid crystal display device comprising:
   a backlight unit, including:
   a lamp that emits a first light;
   a light guiding plate that guides the first light; and
   a lamp reflector disposed adjacent to the lamp to partiafly cover the lamp and receiving the first light exited from the lamp, the lamp reflector having a plurality of protrusion portions to reflect and diffuse the received first light to generate a second light; and
   a display unit that displays an image in response to the second light exited from the backlight unit, the display unit including:

a lower substrate;

an upper substrate opposite to the lower substrate; and a liquid crystal layer disposed between the lower and the upper substrates, wherein the lamp reflector further has a plurality of corrugations, and the protrusion portions are formed on peak portions of the corrugations; and wherein the corrugations are arranged substantially parallel to a longitudinal axis of the lamp.

18. The liquid crystal display device as claimed in claim 17, wherein the lamp reflector has a shape of a wrinkled sheet, and wherein the protrusion portions of the lamp reflector are formed on peak portions of the wrinkled sheet.

19. The liquid crystal display device as claimed in claim 17, wherein each of the protrusion portions of the lamp reflector has a pointed end portion to face the lamp.

20. The liquid crystal display device as claimed in claim 17, wherein each of the protrusion portions of the lamp reflector has a round end portion to face the lamp.

21. The liquid crystal display device as claimed in claim 17, wherein each of the protrusion portions of the lamp reflector has a convex round end portion that faces the lamp.

22. The liquid crystal display device as claimed in claim 17, wherein the lamp reflector further comprises:

a side section;

a first coupling section that extends from a first end of the side section toward an upper surface of the light guiding plate, and contacts and covers an end portion of the upper surface of the light guiding plate; and a second coupling section that extends from a second end of the side section toward a lower surface of the light guiding plate, and contacts and covers an end portion of the lower surface of the light guiding plate.

23. The liquid crystal display device as claimed in claim 22, wherein the side section has an approximately curved face.

24. The liquid crystal display device as claimed in claim 22, wherein the side section has an approximately flat face.

25. The liquid crystal display device as claimed in claim 22, wherein the protrusion portions are formed on at least one of the side section, the first coupling section, and the second coupling section.

* * * * *